(12) United States Patent
Beitelspacher

(10) Patent No.: US 7,293,904 B2
(45) Date of Patent: Nov. 13, 2007

(54) LIGHT PIPE INSULATION TECHNIQUES

(75) Inventor: Dale Beitelspacher, Sonoma, CA (US)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 11/237,025

(22) Filed: Sep. 28, 2005

(65) Prior Publication Data

US 2007/0070644 A1 Mar. 29, 2007

(51) Int. Cl.
*F21V 7/04* (2006.01)
(52) U.S. Cl. .................................................. 362/555
(58) Field of Classification Search ................ 362/555, 362/800, 631, 511, 551, 26, 27
See application file for complete search history.

(56) References Cited

U.S. PATENT DOCUMENTS

| | | | |
|---|---|---|---|
| 5,327,328 A | 7/1994 | Simms et al. ................. 362/26 |
| 5,387,901 A * | 2/1995 | Hardt .................... 340/815.42 |
| 5,760,754 A * | 6/1998 | Amero et al. ................. 345/82 |
| 5,938,324 A | 8/1999 | Salmon et al. ............... 362/555 |
| 6,659,619 B2 | 12/2003 | Gordon ....................... 362/109 |
| 6,719,447 B1 | 4/2004 | Woodward et al. ......... 362/573 |
| 6,969,186 B2 | 11/2005 | Sonderegger et al. ....... 362/551 |
| 7,044,623 B2 | 5/2006 | Olsson et al. ............... 362/477 |
| 2004/0174716 A1* | 9/2004 | Verdes et al. ............... 362/555 |

\* cited by examiner

*Primary Examiner*—Ross Gushi
(74) *Attorney, Agent, or Firm*—BainwoodHuang

(57) ABSTRACT

A circuit board module has a circuit board, a first light emitting diode (LED) mounted to the circuit board, a second LED mounted to the circuit board, and a light pipe assembly disposed adjacent the first and second LEDs. The light pipe assembly is configured to convey light from the first and second LEDs to a viewing area (e.g., a front panel, a faceplate, etc.). The light pipe assembly includes a first light pipe associated with the first LED, a second light pipe associated with the second LED, and an opaque sleeve configured to fit around at least a portion of the first light pipe and inhibit light conveyed through the second light pipe from bleeding into the first light pipe. Such a sleeve is further configurable to prevent each light pipe from inadvertently capturing light from the wrong LED.

20 Claims, 4 Drawing Sheets

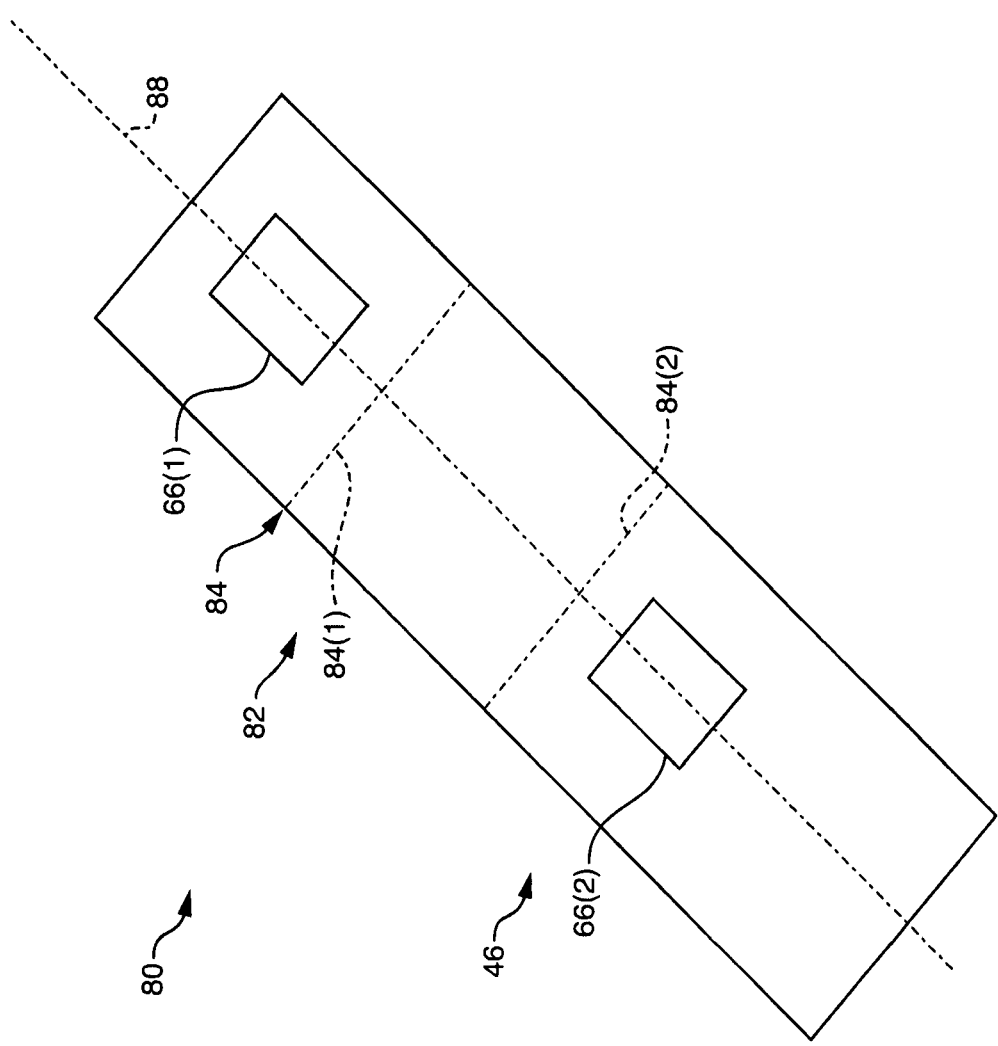

LIGHT PIPE INSULATION TECHNIQUES

BACKGROUND

A typical light pipe is a clear plastic part which conveys light from one location to another. In the context of electronic equipment, manufacturers commonly use light pipes to carry light from light emitting diodes (LEDs) on circuit boards to front panels or faceplates which are viewable by users of the electronic equipment. Accordingly, the manufacturers can enable the users to obtain useful visual information directly from the LEDs of the circuit boards even if the LEDs are nestled deeply behind the front panels or faceplates.

It should be understood that there may be situations in which light from one LED can be inadvertently captured by the wrong light pipe. For example, suppose that a red LED resides next to an amber LED on a particular circuit board. Further suppose that a first light pipe is designed to convey light from the red LED to a front panel, and that a second light pipe is designed to convey light from the amber LED to the front panel.

If the pitch between the two LEDs is very small, the light from the amber LED may be captured by the first light pipe which is designed to convey light from the red LED to the front panel. This problem is commonly referred to as "bleed-through". As a result, the user may misinterpret the light from the first light pipe as being light from the red LED even though that light is actually from the amber LED. Moreover, the light from the amber LED will tend to look almost red and thus could be indistinguishable by the user. Thus, there is a threat that the user could incorrectly read the information from the circuit board.

SUMMARY

One way to prevent the inadvertent capture of light from the wrong light emitting diode (LED) by a light pipe is to friction fit a wedge-shaped object between the LEDs. Unfortunately, such a wedge-shaped object could become dislodged over time, particularly if there is constant vibration of the circuit board (e.g., due to operation of a fan assembly). Additionally, even if such a wedge-shaped object prevents light from one LED from being inadvertently captured by the wrong light pipe, the wedge-shaped object would still not prevent light from bleeding from one light pipe to the other light pipe which could also provide the user with a false reading.

Furthermore, one way to prevent light from bleeding from one light pipe to another light pipe is to dispose a light-blocking tape between the two light pipes. Unfortunately, positioning of such tape is manually cumbersome (e.g., a technician must properly insert the tape between the two light pipes). Additionally, there is still a chance that the tape could easily dislodge itself from its installed position (e.g., due to vibration) and thus no longer prevent the light from bleeding between light pipes.

In contrast to the above-described ways to preventing incorrect conveyance of light through light pipes, improved techniques prevent such incorrect conveyance by utilizing an opaque sleeve which fits around at least a portion of one of the light pipes. Such an opaque sleeve is capable of easily installing and remaining in position in a positive retention manner. Furthermore, once the opaque sleeve is in place, the opaque sleeve is capable of preventing a light pipe from inadvertently capturing light from the wrong LED, as well as inhibiting the bleeding of light between light pipes.

One embodiment is directed to a circuit board module having a circuit board, a first LED mounted to the circuit board, a second LED mounted to the circuit board, and a light pipe assembly disposed adjacent the first and second LEDs. The light pipe assembly is configured to convey light from the first and second LEDs to a viewing area (e.g., a display, a front panel, a faceplate, etc.). The light pipe assembly includes a first light pipe associated with the first LED, a second light pipe associated with the second LED, and an opaque sleeve configured to fit around at least a portion of the first light pipe and inhibit light conveyed through the second light pipe from bleeding into the first light pipe. Such a sleeve is further configurable to prevent each light pipe from inadvertently capturing light from the wrong LED.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a perspective view of an opaque sleeve of the light pipe assembly of FIG. 3 prior to installation of the opaque sleeve on a unitary, integrated light pipe structure.

DETAILED DESCRIPTION

Improved techniques prevent incorrect conveyance of light through light pipes by utilizing an opaque sleeve which fits around at least a portion of one of the light pipes. Such an opaque sleeve is capable of easily installing and remaining in position and its geometry and flexibility allows it to position itself between light emitting diodes. Additionally, once the opaque sleeve is in place, the opaque sleeve is capable of preventing a light pipe from inadvertently capturing light from the wrong light emitting diode (LED), as well as inhibiting the bleeding of light between light pipes.

Figure 1:
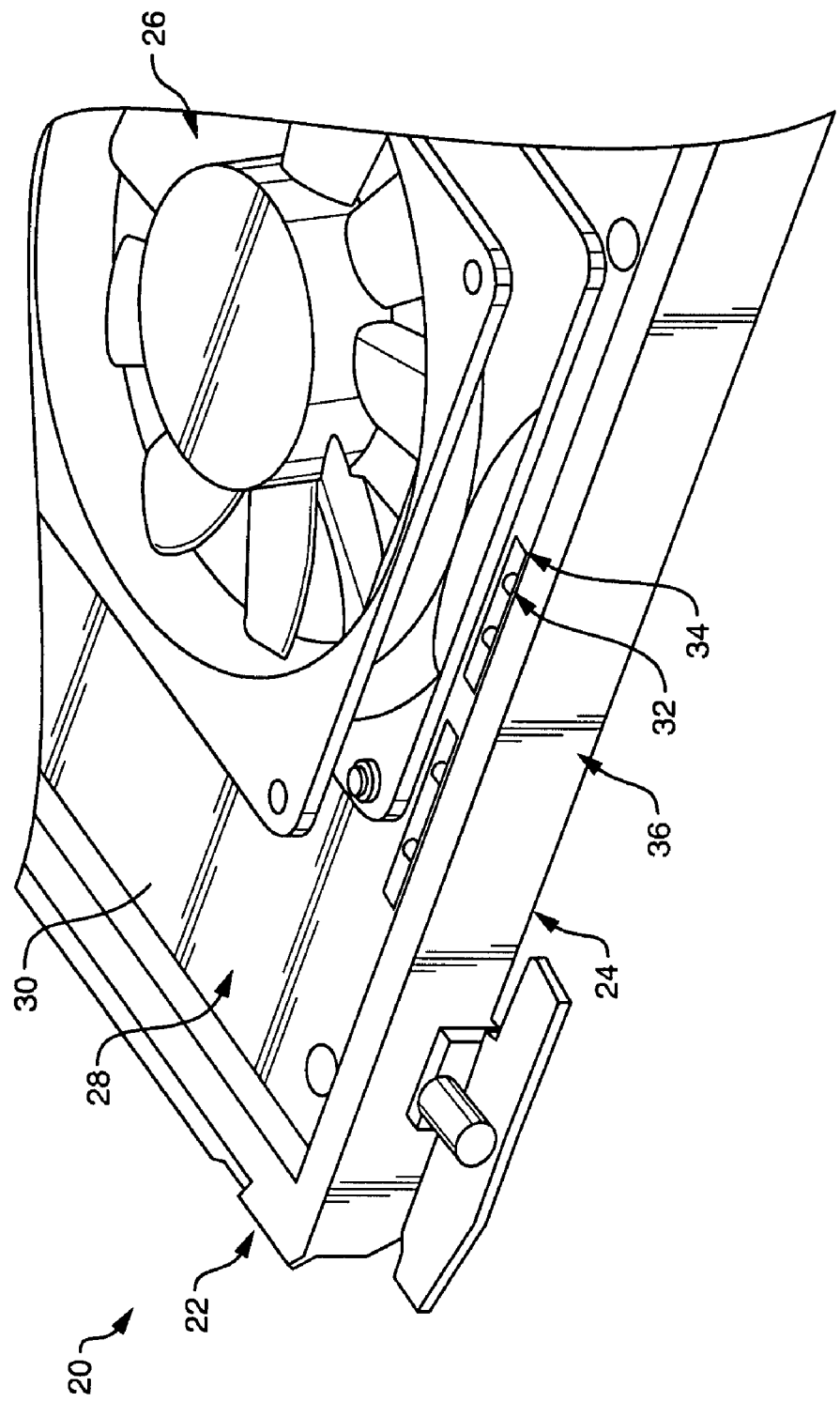
FIG. 1 is a perspective view of an electronic system having an improved mechanism for preventing incorrect conveyance of light through light pipes.

FIG. 1 shows an electronic system 20 which employs a sleeve mechanism for insulating light pipes. The electronic system 20 includes a frame 22, a display 24 (e.g., a front panel, a faceplate, etc.), a fan assembly 26 and a circuit board module 28. The frame 22 is configured to support the display 24, the fan assembly 26 and the circuit board module 28. The frame 22 is capable of residing within a variety of installation locations including a standard equipment shelf or rack, a custom cabinet, a dedicate chassis, and so on.

The circuit board module 28 includes a circuit board 30, LEDs 32 mounted to the circuit board 30, and light pipe assemblies 34 which are also mounted to the circuit board 30. By way of example only, the LEDs 32 (shown generally by the arrow 32 in FIG. 1) have a variety of colors (e.g., red, amber, green, etc.). During operation, each LED 32 is capable of outputting a variety of visual light signals (e.g., no light, slow blinking, fast blinking, single flashes, double flashes, continuous light, combinations thereof, etc.) to viewing areas 36 on the display 24. Accordingly, the LEDs 32 are capable of providing a wealth of information to a user (e.g., operating states of the system 20, the status of individual components, the presence of inbound or outbound network traffic, etc.). As will now be explained in further detail with reference to FIGS. 2 and 3, the light pipe assemblies 34 are configured to prevent incorrect conveyance of light from the LEDs 32 to the viewing areas 36 of the display 24.

Figure 2:
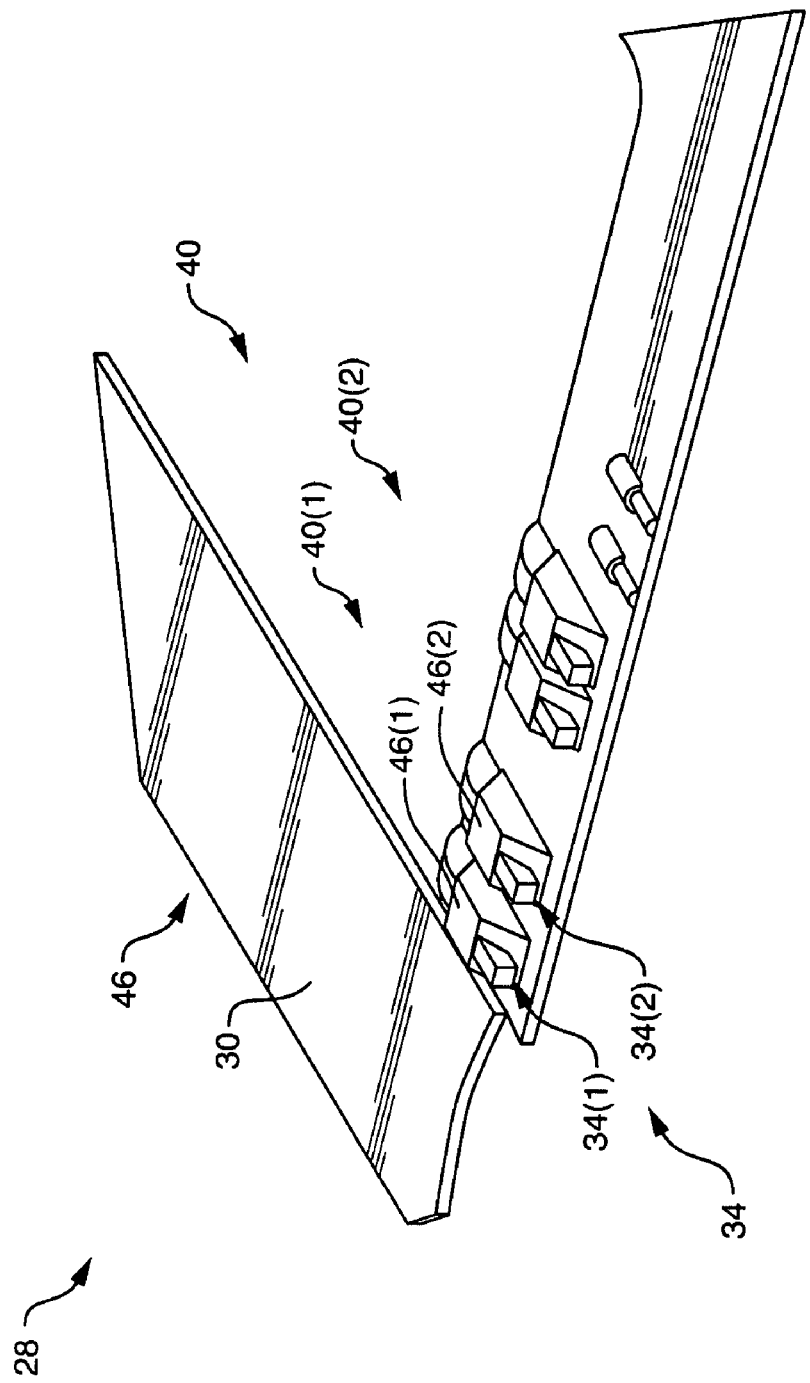
FIG. 2 is a perspective view of a circuit board module of the electronic system of FIG. 1.

FIG. 2 shows particular details of the circuit board module 28. As shown in FIG. 2, the circuit board module 28 includes multiple LED pairs 40(1), 40(2), ... (collectively, LED pairs 40) which are mounted to the circuit board 30 and which correspond to multiple light pipe assemblies 34(1), 34(2), ... (collectively, light pipe assemblies 34).

Figure 3:
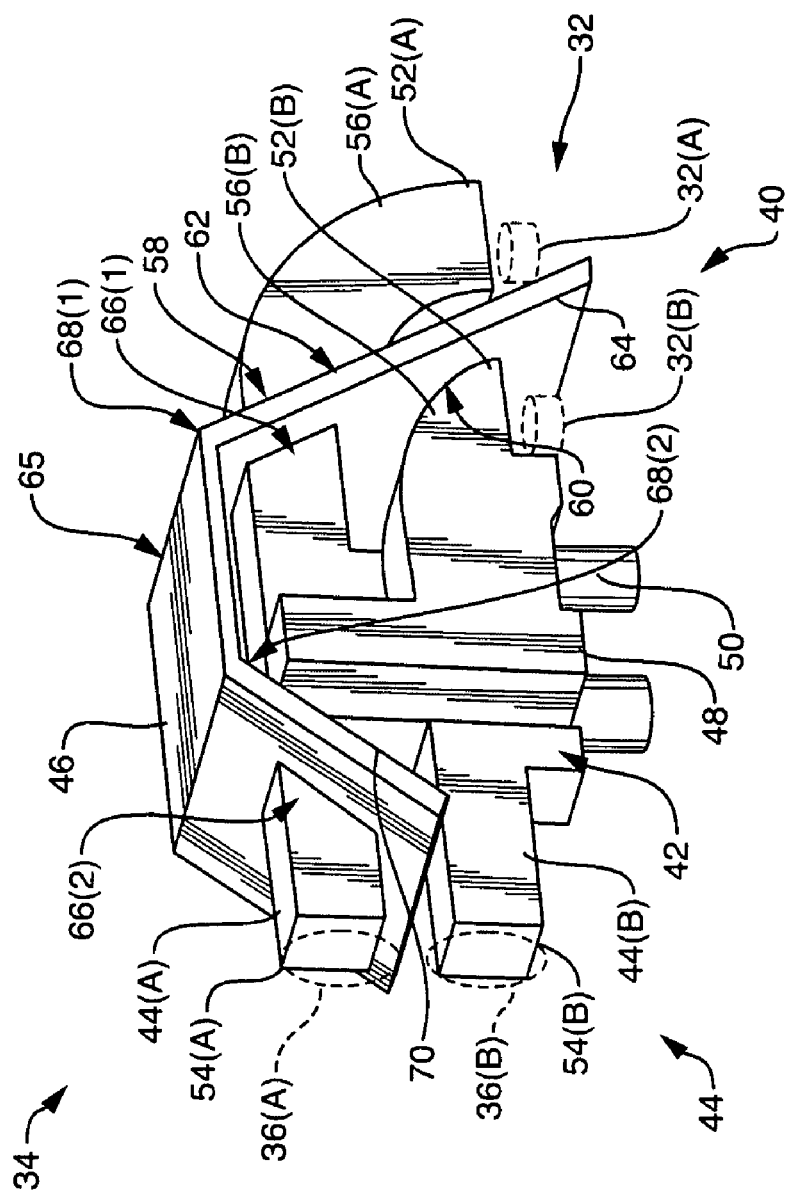
FIG. 3 is a perspective view of a light pipe assembly of the circuit board module of FIG. 2.

FIG. 3 shows particular details of a light pipe assembly 34. As shown in FIG. 3, each light pipe assembly 34 includes a unitary, integrated light pipe structure 42 having a pair of light pipes 44(A), 44(B) (collectively, light pipes 44), and an opaque sleeve 46. Each integrated light pipe structure 42 further includes tooling beams 48 which rigidly hold the light pipes 44 in place relative to each other, and mounting posts 50 which are configured to insert into the circuit board 30 (FIG. 2) for proper positioning of the integrated light pipe structure 42 relative to a particular pair 40 of LEDs 32. In this arrangement, each light pipe structure 42 is configured convey light from one of the LED pairs 40 toward the display 24 (also see FIG. 1). Specifically, the light pipe 44(A) is configured to convey light from an LED 32(A) (shown generally by the wire-frame object 32(A) in FIG. 3) to one location 36(A) on the display 24, and the light pipe 44(B) is configured to convey light from an LED 32(B) (shown generally by the wire-frame 32(B) in FIG. 3) to another location 36(B) on the display 24 (also see the viewing areas 36 in FIG. 1).

As shown in particular detail in FIG. 3, the light pipe 44(A) has a first end 52(A) and a second end 54(A). Similarly, the light pipe 44(B) has a first end 52(B) and a second end 54(B). The ends 52(A), 54(B) reside very close to each other and thus enable their associated LEDs 32(A), 32(B) to reside close to each other on the circuit board 30. Furthermore, the light pipes 44(A), 44(B) have bend portions 56(A), 56(B) which enable the light pipes 44(A), 44(B) to change the direction of light conveyed therethrough. These bend portions 56(A), 56(B) closely mirror each other and turn at relatively sharp angles to enable the system 20 to maintain a low profile (e.g., a 1U form factor for minimal space consumption within an electronic shelf or rack). Nevertheless, each light pipe 44(A), 44(B) robustly captures the light from its respective LED 32(A), 32(B) and effectively conveys and emits that light to the display 24 (FIG. 1).

As shown in FIG. 3, the opaque sleeve 46 of each light pipe assembly 34 is configured to fit around at least a portion 58 of the light pipe 44(A) and thus inhibit light conveyed through the light pipe 44(B) from bleeding into the light pipe 44(A). In particular, due to the aggressive angle of the bend portion 56(B), it is possible that light may escape from the light pipe 44(B). However, a part 60 of the opaque sleeve 46 is disposed between the portion 56(B) and a portion 62 of the light pipe 44(A) which could otherwise capture that escaping light if the part 60 were not there. Accordingly, the light pipe 44(A) is thoroughly insulated from such light and thus that light will not bleed into the light pipe 44(A) and the display 24 (FIG. 1) will output the light correctly.

As further shown in FIG. 3, an end 64 of the opaque sleeve 46 extends between the individual LEDs 32(A), 32(B) of the LED pair 40. This end 64 therefore operates as a light barrier between the individual LEDs 32(A), 32(B). That is, the end 64 prevents the light pipe 44(A) from capturing light from the LED 32(B), and further prevents the light pipe 44(B) from capturing light from the LED 32(A). Moreover, the end 64 enables the manufacturer to position the LEDs 32(A), 32(B) closely together and thus optimize use of circuit board real estate.

The opaque sleeve 46 is formed of a thin, flexible material. In some arrangements, this flexible material is configured to concurrently (i) inhibit electrical conductivity to prevent creation of electrical shorts on the circuit board 30, (ii) provide low flammability to avoid being a fire hazard risk, and (ii) block light to thoroughly insulate the light pipes 44, among other things. Suitable materials include Formex® and certain UV-resistant polycarbonates.

Additionally, a section 65 of the opaque sleeve 46 defines a first hole 66(1), a second hole 66(2), a first fold 68(1) adjacent the first hole 66(1), and a second fold 68(2) adjacent the second hole 66(2). Accordingly, the opaque sleeve 46 defines a series of three planar sections 70.

In view of the flexible nature and shape of the opaque sleeve 46, it should be understood that it is a straightforward and simple process to install the opaque sleeve 46 onto the integrated light pipe structure 42. In particular, a user simply inserts the ends 52(A), 54(A) of the light pipe 44(A) through the holes 66(1), 66(2) defined by the opaque sleeve 46. For example, the user can initially insert the end 52(A) through the hole 66(1) defined by the opaque sleeve 46 and slide the light pipe 44(A) deeply through the hole 66(1) until the other end 54(A) of the light pipe 44(A) aligns with the hole 66(2). The user can then insert the end 54(A) of the light pipe 44(A) through the hole 66(2), and center the opaque sleeve 46 on the light pipe 44(A) as shown in FIG. 3. At this point, the user inserts the mounting posts 50 of the integrated light pipe structure 42 into alignment holes of the circuit board 30. The user makes sure that the end 64 which extends from the section 65 of the opaque sleeve 46 sits between the LEDs 32(A), 32(B) thus completing installation of the light pipe assembly 34. As a result of the light pipe 44(A) passing through both holes 66(1), 66(2) defined by the opaque sleeve 46, the light pipe 44(A) positively retains the opaque sleeve in proper position relative to the other light pipe 44(B) and the LEDs 32(A), 32(B). Thus, the opaque sleeve 46 continues to insulate the light pipes 44 and ensure proper conveyance of light even in situations of vibration (e.g., due to operation of the fan assembly 26, also see FIG. 1). Further details will now be provided with reference to FIG. 4.

FIG. 4 shows the opaque sleeve 46 in a partially manufactured cutout state (i.e., after stamping and before folding). Here, the manufacturer starts with a sheet 80 of the thin, flexible material (shown generally by the reference numeral 80 in FIG. 4). The manufacturer then stamps the sheet 80 (e.g., using conventional pressing and cutting machinery) to create a pattern 82 as shown in FIG. 4. In particular, the manufacturer cut the holes 66(1), 66(2) and embeds creases 84(1), 84(2) adjacent the holes 66(1), 66(2). In some arrangements, the creases 84(1), 84(2) are formed by scoring the sheet 80 in a direction 86 which is substantially perpendicular to a long axis 88 of the pattern 82. In some arrangements, the sheet 80 is scored one-third of the depth of the sheet 80. Such creases 84(1), 84(2) mark where the user eventually bends the pattern 82 in order to form the folds 68(1), 68(2) (also see FIG. 3).

In some arrangements, the pattern 82 is one of several patterns 82 which have been made simultaneously from the same sheet 80 (e.g., in a two-dimensional array of patterns 82, in a series of patterns 82 along the long axis 88, etc.). As a result, the opaque sleeve 46 can be manufactured in a low cost, high volume manner.

As described above, improved light pipe insulation techniques an opaque sleeve 46 which fits around at least a portion of a light pipe 44. Such an opaque sleeve 46 is capable of easily installing and remaining in position even in an environment having vibration (e.g., due to operation of a fan assembly 26). Additionally, once the opaque sleeve 46 is in place, the opaque sleeve 46 is capable of preventing a light pipe 44 from inadvertently capturing light from a wrong LED 32, as well as inhibiting the bleeding of light between light pipes 44.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A circuit board module, comprising:
   a circuit board;
   a first light emitting diode mounted to the circuit board;
   a second light emitting diode mounted to the circuit board; and
   a light pipe assembly disposed adjacent the first and second light emitting diodes, the light pipe assembly being configured to convey light from the first and second light emitting diodes to a viewing area, the light pipe assembly including:
      a first light pipe associated with the first light emitting diode,
      a second light pipe associated with the second light emitting diode, and
      an opaque sleeve configured to fit around at least a portion of the first light pipe and inhibit light conveyed through the second light pipe from bleeding into the first light pipe, the opapue sleeve being formed from a sheet of thin, flexible material which is stamped and folded.

2. A circuit board module as in claim 1 wherein the opaque sleeve, which is formed from the sheet of thin, flexible material, is generated from paper-thin, polycarbonate stock.

3. A circuit board module as in claim 1 wherein the first and second light pipes of the light pipe assembly are formed as a unitary, integrated light pipe structure.

4. A circuit board module as in claim 3 wherein the second light pipe includes a bend portion, and wherein a sleeve section of the opaque sleeve is disposed adjacent the bend portion of the second light pipe between the first and second light pipes to block light from escaping the bend portion of the second light pipe and being captured by the first light pipe.

5. A circuit board module as in claim 4 wherein the first light pipe is configured to capture light from the first light emitting diode of the circuit board; wherein the second light pipe is configured to capture light from the second light emitting diode of the circuit board; wherein an end of the opaque sleeve is configured to extend from the sleeve section and reside between the first and second light emitting diodes to prevent (i) the first light pipe from capturing light from the second light emitting diode and (ii) the second light pipe from capturing light from the first light emitting diode.

6. A circuit board module as in claim 5 wherein the thin, flexible material is configured to concurrently inhibit electrical conductivity, provide low flammability, and block light.

7. A circuit board module as in claim 3 wherein the opaque sleeve defines a first hole and a second hole; wherein a first end of the first light pipe is configured to install through the first hole defined by the opaque sleeve and wherein a second end of the first light pipe is configured to install through the second hole defined by the opaque sleeve to provide positive retention of the opaque sleeve with the unitary, integrated light pipe structure.

8. A circuit board module as in claim 7 wherein, when the sheet is stamped and folded to form the opaque sleeve, opaque sleeve defines a first fold adjacent the first hole and a second fold adjacent the second hole.

9. A circuit board module, comprising:
   a first light emitting diode;
   a second light emitting diode;
   means for supporting the first and second light emitting diodes; and
   a light pipe assembly disposed adjacent the first and second light emitting diodes, the light pipe assembly being configured to convey light from the first and second light emitting diodes to a viewing area, the light pipe assembly including:
      a first light pipe associated with the first light emitting diode,
      a second light pipe associated with the second light emitting diode, and
      an opaque sleeve configured to fit around at least a portion of the first light pipe and inhibit light conveyed through the second light pipe from bleeding into the first light pipe, the opaque sleeve being formed from a sheet of thin, flexible material which is stamped and folded.

10. A circuit board module as in claim 9 wherein the opaque sleeve, which is formed from the sheet of thin, flexible material, is generated from paper-thin, polycarbonate stock.

11. A light pipe assembly, comprising:
    a first light pipe;
    a second light pipe coupled to the first light pipe; and
    an opaque sleeve configured to fit around at least a portion of the first light pipe and inhibit light conveyed through the second light pipe from bleeding into the first light pipe, the opaque sleeve being formed from a sheet of thin, flexible material which is stamped and folded.

12. A light pipe assembly as in claim 11 wherein the opaque sleeve, which is formed from the sheet of thin, flexible material, is generated from paper-thin, polycarbonate stock.

13. A light pipe assembly as in claim 11 wherein the first and second light pipes are formed as a unitary, integrated light pipe structure.

14. A light pipe assembly as in claim 13 wherein the second light pipe includes a bend portion, and wherein a sleeve section of the opaque sleeve is disposed adjacent the bend portion of the second light pipe between the first and second light pipes to block light from escaping the bend portion of the second light pipe and being captured by the first light pipe.

15. A light pipe assembly as in claim 14 wherein the first light pipe is configured to capture light from a first light emitting diode of a circuit board; wherein the second light pipe is configured to capture light from a second light emitting diode of the circuit board; wherein an end of the opaque sleeve is configured to extend from the sleeve section and reside between the first and second light emitting diodes to prevent (i) the first light pipe from capturing light from the second light emitting diode and (ii) the second light pipe from capturing light from the first light emitting diode.

16. A light pipe assembly as in claim 15 wherein the thin, flexible material is configured to concurrently inhibit electrical conductivity, provide low flammability, and block light.

17. A light pipe assembly as in claim 13 wherein the opaque sleeve defines a first hole and a second hole; wherein a first end of the first light pipe is configured to install through the first hole defined by the opaque sleeve and wherein a second end of the first light pipe is configured to install through the second hole defined by the opaque sleeve to provide positive retention of the opaque sleeve with the unitary, integrated light pipe structure.

18. A light pipe assembly as in claim 17 wherein, when the sheet is stamped and folded to form the opaque sleeve, opaque sleeve defines a first fold adjacent the first hole and a second fold adjacent the second hole.

19. A barrier to provide light pipe insulation, the barrier comprising:

an opaque sleeve configured to fit around at least a portion of a first light pipe and inhibit light conveyed through a second light pipe from bleeding into the first light pipe, the opaque sleeve being formed from a sheet of thin, flexible material which is stamped and folded.

20. A barrier to provide light pipe insulation as in claim 19 wherein the opaque sleeve, which is formed from the sheet of thin, flexible material, is generated from paper-thin, polycarbonate stock.

* * * * *